(12) United States Patent
Razeti et al.

(10) Patent No.: US 7,128,210 B2
(45) Date of Patent: Oct. 31, 2006

(54) PACKAGE PARTICULARLY FOR PACKAGING FOOD PRODUCTS

(75) Inventors: Marco Razeti, Località Mandria (IT); Elena Peron, Schio (IT)

(73) Assignee: Alcan Packaging Italia S.R.L., Lugo di Vicenza (IT)

( * ) Notice: Subject to any disclaimer, the term of this patent is extended or adjusted under 35 U.S.C. 154(b) by 304 days.

(21) Appl. No.: 10/701,524

(22) Filed: Nov. 6, 2003

(65) Prior Publication Data

US 2004/0094447 A1 May 20, 2004

(30) Foreign Application Priority Data

Nov. 14, 2002 (IT) .......................... PD2002A0291

(51) Int. Cl.
*B65D 75/26* (2006.01)
*B65D 75/28* (2006.01)
(52) U.S. Cl. .................... 206/484.2; 426/127
(58) Field of Classification Search ............ 206/484.2, 206/484; 426/126, 127
See application file for complete search history.

(56) References Cited

U.S. PATENT DOCUMENTS

| 4,850,526 A | 7/1989 | Naef |
| 5,158,836 A * | 10/1992 | Schirmer et al. ............ 428/336 |
| 5,664,670 A * | 9/1997 | Cozzie ......................... 206/216 |
| 6,190,760 B1 * | 2/2001 | Nagai et al. ................. 428/213 |
| 6,905,568 B1 * | 6/2005 | Hanes et al. ............ 156/244.27 |

FOREIGN PATENT DOCUMENTS

| BE | 424 609 | 12/1937 |
| WO | 98/22281 | 5/1998 |
| WO | 00/13520 | 3/2000 |
| WO | 02/062576 | 8/2002 |

\* cited by examiner

*Primary Examiner*—Mickey Yu
*Assistant Examiner*—Jerrold Johnson
(74) *Attorney, Agent, or Firm*—Modiano & Associati; Albert Josif; Daniel J. O'Byrne

(57) ABSTRACT

A package particularly for packaging food products, comprising an inner package sheet, which individually wraps each product of the package and is composed of a coextruded film constituted by two outer layers of a styrene-butadiene copolymer resin and by a central layer chosen among polyethylene, polypropylene and other plastic material, and an outer package sheet, which wraps around a set of products contained in their respective inner packages and is composed of a high-barrier film coupled to a paper film.

8 Claims, 2 Drawing Sheets

PACKAGE PARTICULARLY FOR PACKAGING FOOD PRODUCTS

BACKGROUND OF THE INVENTION

The present invention relates to a package particularly but not exclusively for packaging food products.

As is known, candies are currently usually packaged in sticks with a double package: an outer one and an inner one.

The outer package can be tubular or shaped like a parallelepiped and is normally constituted by a lamination of paper and aluminum (i.e., composed of individual films of paper and aluminum that are mutually coupled by lamination), in which the edges are made to overlap (by means of folds or contoured portions) and heat-sealed (by means of inside-to-outside thermal bonding) and the end edges are folded and heat-sealed, or in which the edges, including the end edges, are subjected to inside-to-inside thermal bonding and then folded and heat-sealed.

The heat seals are provided in various manners by way of thermal bonding lacquers, waxes or others.

In any case, the following performance is generally required:
  good fold retention in order to facilitate closure;
  structural rigidity in order to produce the shape;
  tearability in order to facilitate opening;
  good heat-sealing strength.

For the internal package, which is provided for each individual candy, typically a single film (biaxially oriented polypropylene, cellophane or others) or paper (waxed paper or paper subjected to other treatments) is used instead, but in some cases paper/aluminum laminations are also used.

Currently, the market shows an increasing demand for packaged candies arranged loosely in containers made of light cardboard that is coated internally with polythene and is wrapped externally and sealed with a cellophane film (in a cigarette-like fashion).

However, this type of packaging is unsuitable for milk-based candies or candies manufactured with ingredients that are easily perishable or can easy adhere to each other when they are in contact.

For these candies, the trend is to maintain the conventional stick-like shape, although an attempt is made to provide the longitudinal and end closures by mating the edges in an inside-to-inside fashion and heat-sealing, instead of resorting to folding with inside-to-outside mating and corresponding heat-sealing with thermal bonding lacquer or wax.

Since the inside-to-inside heat-seal is continuous, it should ensure full closure of the tubular element, providing barrier conditions that reduce the inflow of oxygen and water valor or the outflow of aromas.

However, difficulties in disposing and recycling laminates manufactured with aluminum films, the increasing sensitivity of consumers to these problems, and the dissuasive measures taken in some countries against the use of laminates with aluminum films, as well as cost saving, are leading to forced replacement of conventional packages that contain aluminum.

SUMMARY OF THE INVENTION

The aim of the present invention is to provide a package particularly for packaging food products, of the type with an inner package sheet and an outer package sheet, in which the latter, although being aluminum-free, still ensures similar barrier properties.

An object of the present invention is to provide a package in which the outer sheet is such as to preserve, as a whole, the required mechanical properties of fold retention, rigidity, tearability and heat-sealability, at a lower cost than the aluminum/paper sheet that is used at present.

Another object of the present invention is to provide a package in which the inner sheet ensures inside-to-inside, outside-to-outside and inside-to-outside heat-sealability between its edges, but not with the external container (when it has a plastic film on its inner side), accordingly meeting the packaging needs dictated by the various shapes of the products to be contained.

Another object of the present invention is to provide a package that has a high yield, with a consequent saving of material.

This aim and these and other objects that will become better apparent hereinafter are achieved by a package particularly for packaging food products, characterized in that it comprises:

an inner package sheet, which individually wraps each product of the package and is composed of a coextruded film constituted by two outer layers of a styrene-butadiene copolymer resin and by a central layer chosen among polyethylene, polypropylene and other plastic material, and an outer package sheet, which wraps around the set of products contained in their respective inner packages and is composed of a high-barrier film coupled to a paper film.

BRIEF DESCRIPTION OF THE DRAWINGS

Further characteristics and advantages of the invention will become better apparent from the following detailed description of an embodiment thereof, illustrated by way of nonlimiting example in the accompanying drawings, wherein.

DESCRIPTION OF THE PREFERRED EMBODIMENTS

Figure 1:
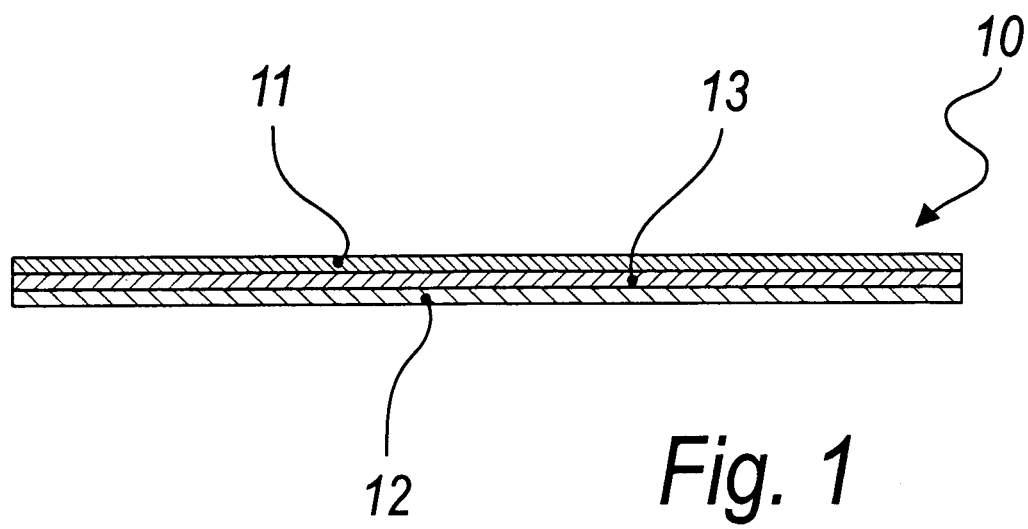
FIG. 1 is a schematic sectional view of an inner package sheet.
Figure 2:
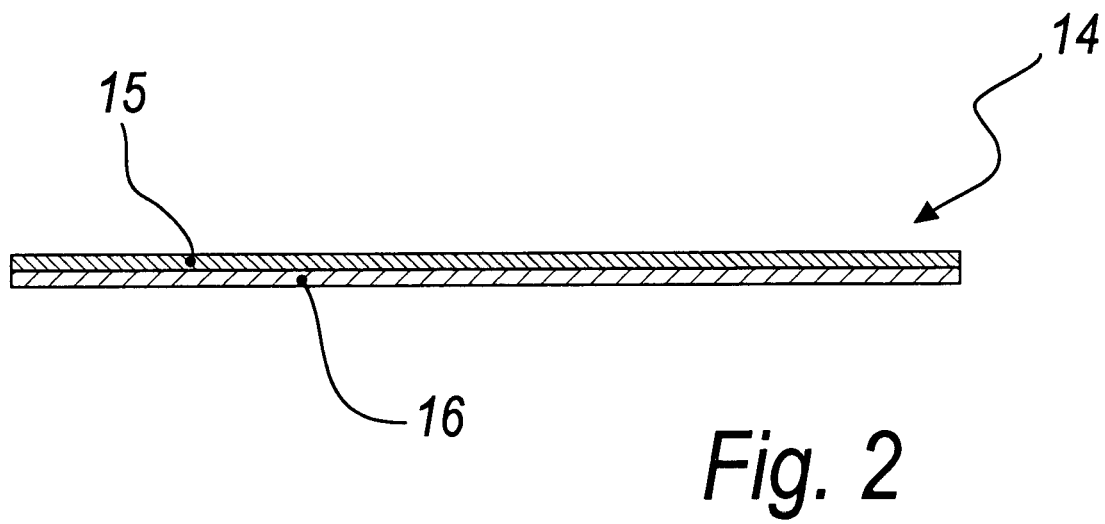
FIG. 2 is a schematic sectional view of an outer package sheet.
Figure 3:
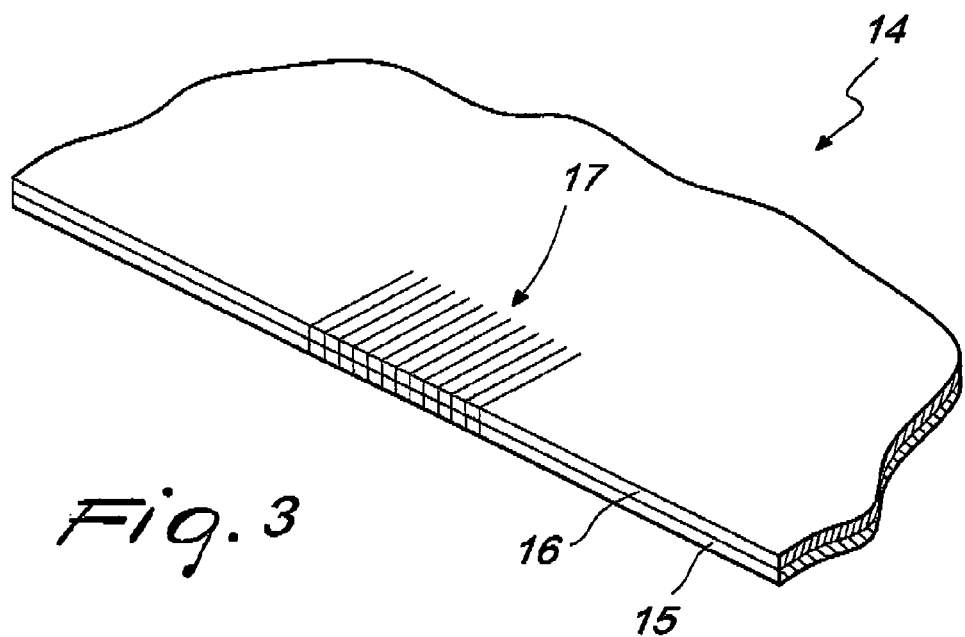
FIG. 3 is a schematic perspective view of the other sheet provided with cuts.
Figure 4:
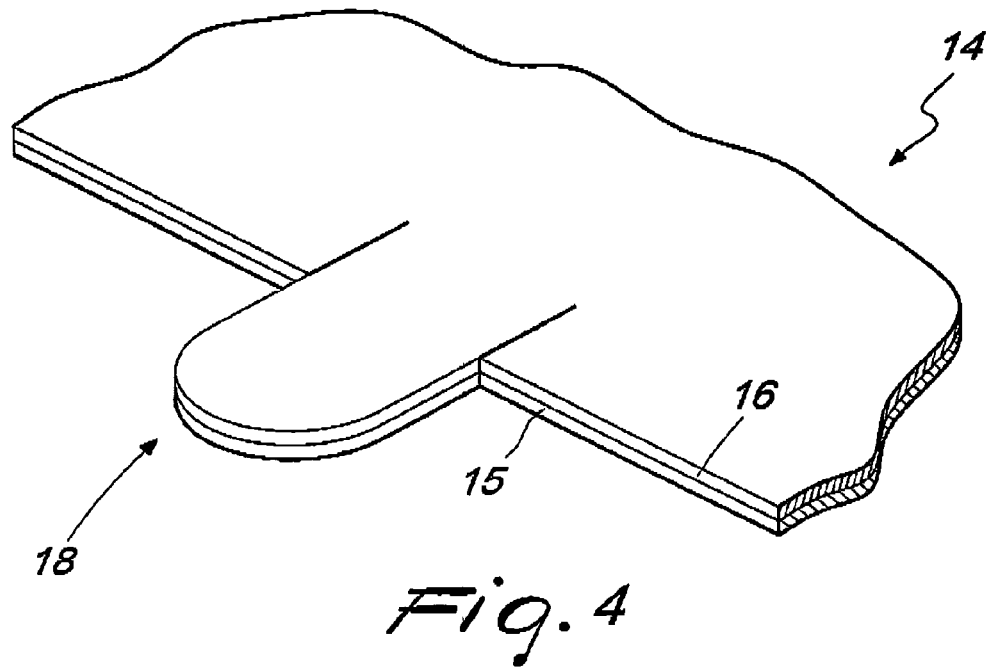
FIG. 4 is a schematic perspective view of the outer sheet provided with a tab.

With reference to the figures, a package according to the invention, particularly for packaging food products, for example candies, comprises an inner package sheet 10, which individually wraps each candy of the package and is composed of a coextruded film constituted by two outer layers, which are designated by the reference numerals 11 and 12 respectively and are made of a styrene-butadiene copolymer resin, and by a central layer 13, which is chosen among polyethylene, polypropylene and other plastic material, and an outer package sheet 14, which wraps the set of candies contained in their respective inner packages and comprises a high-barrier film 15 that is metallized or non-metallized (i.e., treated or not with a very light surface deposition of metal), coupled to a paper film 16.

It is possible to package in a stick a plurality of candies or products with both an inner (individual) package and an outer package, and to package an individual candy or product with an inner package and an outer package.

In the case of stick packaging, the inner package is designed to separate each candy from the others and from the outer package, and in the case of individual packaging the inner package is designed only to separate the food from the outer package.

As mentioned, the inner wrapping sheet 10 is constituted by two outer layers 11 and 12 made of a styrene-butadiene copolymer resin and by a central layer 13 chosen among polyethylene, polypropylene or other plastic material.

It is possible to use, for the layers 11 and 12, styrene-butadiene resins with melt indexes comprised between 7 and 16 g/10 min (i.e., the weight of material that melts in 10 minutes time).

For cost reasons, it is convenient to provide a sheet 10 with thicknesses between 20 and 30 microns, in which the outer layers have thicknesses that can vary between 3 and 5 microns.

The sheet 10 ensures inside-to-inside, outside-to-outside and inside-to-outside heat-sealability, but does not ensure heat-sealability with the inner surface (high-barrier film 15) of the outer container 14, thus meeting the packaging requirements dictated by the various candy shapes.

It is possible to use conveniently, for the layers 11 and 12 of the sheet 10, per se known resins that are known commercially by the trade names BASF STIROLUX or CHEVRON PHILLIPS KR10 or others.

The outer package sheet 14 is constituted by a lamination that is the result of the coupling of a paper film 16 and of a high-barrier film 15 (to prevent the inflow of oxygen and water vapor) constituted by biaxially oriented metallized polypropylene, arranged so that the metallized surface lies on the side of the paper.

The sheet 14 thus composed retains as a whole the required mechanical properties of fold retention, rigidity, tearability and heat-sealability at a lower cost than the aluminum/paper sheet currently used.

As regards tearability, it is retained sufficiently with thicknesses of the biaxially oriented polypropylene film 15 of less than 15 microns.

In any case, for initial opening, the presence of a pre-cut is an important requirement that allows to obviate any difficulties in opening caused by the polypropylene.

In any case, a plurality of per se known systems of pre-cuts 17 and/or tabs 18 can be introduced.

In practice it has been found that the intended aim and all the objects of the present invention have been achieved.

The invention thus conceived is susceptible of numerous modifications and variations, all of which are within the scope of the appended claims.

All the details may further be replaced with other technically equivalent elements.

In practice, the materials employed, so long as they are compatible with the contingent use, as well as the dimensions, may be any according to requirements.

The disclosures in Italian Patent Application No. PD2002A000291 from which this application claims priority are incorporated herein by reference.

What is claimed is:

1. A package particularly for packaging food products, comprising:
   an inner package sheet, which individually wraps each product of the package and is composed of a coextruded film constituted by two outer layers of a styrene-butadiene copolymer resin and by a central layer chosen from one of polythylene, polypropylene and other plastic material, or
   an outer package sheet, which wraps around a set of products contained in their respective inner packages and is composed of a high-barrier film coupled to a paper film.

2. The package according to claim 1, wherein said high-barrier film is metallized.

3. The package according to claim 1, wherein said inner package sheet has said outer layers made of styrene-butadiene resins with melt indexes substantially comprised between 7 and 16 g/10 mm.

4. The package according to claim 1, wherein said inner package sheet has thicknesses between 20 and 30 microns, and wherein the outer layers have thicknesses that can vary between 3 and 5 microns.

5. The package according to claim 1, wherein said outer package sheet is constituted by a lamination produced by coupling of said paper film and of said high-barrier film constituted by biaxially oriented metallized polypropylene, in which the metallized surface is arranged on the paper side.

6. The package according to claim 5, wherein said biaxially oriented polypropylene film of said outer package sheet has thicknesses of 15 microns or less.

7. The package accordlipg to claim 1, wherein said outer package sheet has at least one pre-cut to facilitate its opening.

8. The package according to claim 1, wherein said outer package sheet has at least one tab to facilitate opening.

* * * * *